June 21, 1932. C. A. WILSON 1,863,956
BUSHING REMOVER AND REPLACER
Filed June 11, 1931
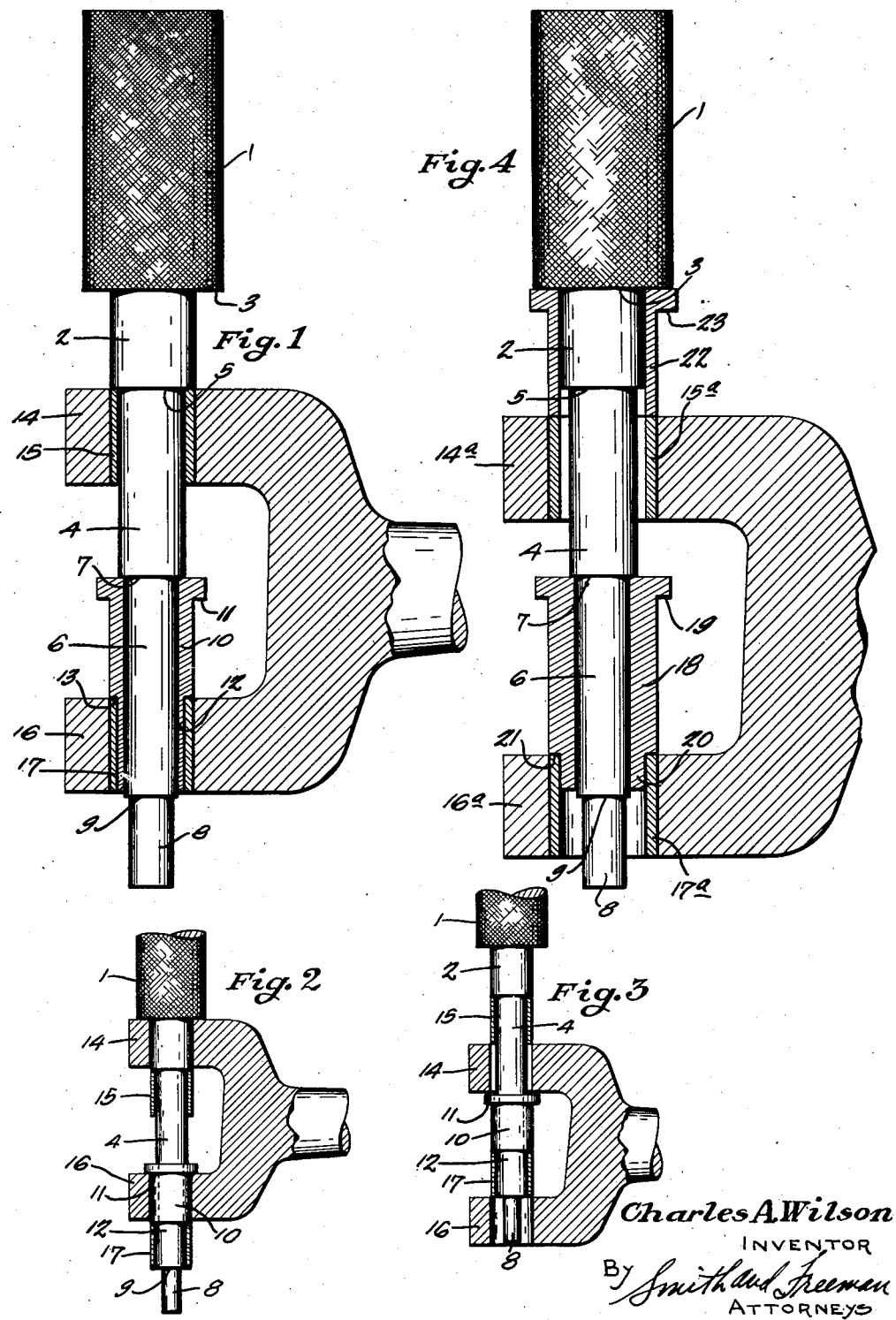
Charles A. Wilson
INVENTOR
By Smith and Freeman
ATTORNEYS Patented June 21, 1932

1,863,956

UNITED STATES PATENT OFFICE

CHARLES A. WILSON, OF EUCLID, OHIO

BUSHING REMOVER AND REPLACER

Application filed June 11, 1931. Serial No. 543,589.

This invention relates to tools for removing bushings from bearings and for replacing bushings therein, and the principal object of the invention is to provide a new and improved device of this character. In the drawing accompanying this specification and forming a part of this application, I have shown, for the purpose of illustration, one form which my invention may assume, and in this drawing:

Figure 1 is a view partly in side elevation and partly in vertical section of a tool constructed in accordance with my invention, Figure 2 is a similar view on a smaller scale showing the position of the parts when the bushings have been forced from a pair of spaced bearings, Figure 3 is a view similar to Figure 2, but showing the position of the parts when the tool is employed for the purpose of inserting new bushings in a pair of spaced bearings, while Figure 4 is a view similar to Figure 1, but with a tool equipped with adaptors for operating on bushings having a larger diameter than those shown in Figure 1.

A tool embodying the invention is herein disclosed as comprising a main member having a handle 1, a first reduced portion 2 forming a first shoulder 3, a second reduced portion 4 forming a second shoulder 5, a third reduced portion 6 forming a third shoulder 7, and a fourth reduced portion 8 forming a shoulder 9.

An auxiliary member in the form of a sleeve 10 is removably mounted on the reduced portion 6 of the main portion for abutting engagement with the shoulder 7 and is formed with a shoulder 11 adjacent to its upper end and with a reduced portion 12 adjacent to its lower end forming a shoulder 13.

The present tool is particularly designed and adapted to remove bushings from spaced axially aligned bearings simultaneously and with but one operation, and also simultaneously to insert new bushings in bearings of this type. For the purpose of illustration, I have shown the tool in position to operate upon an upper bearing 14 provided with a bushing 15 and on a lower bearing 16 provided with a bushing 17, the bearings 14 and 16 being arranged in axial alignment and in spaced relation with one another.

In use, the auxiliary member 10 of the tool is first inserted between the bearings 14 and 16 with the reduced portion 12 thereof extending into the lower bushing 17 and with the shoulder 13 seating upon the upper end of the bushing 17. The main member of the tool is then inserted through the upper bushing 15 until the shoulder 7 thereof engages the upper end of the auxiliary member 10 and the shoulder 5 engages the upper end of the upper bushing 15.

Pressure is then applied to the handle 1 in any preferred manner, which results in the upper bushing 15 and the lower bushing 17 being simultaneously forced down until they are entirely removed from the bearings 14 and 16. At this point, the shoulder 3 on the main member of the tool engages the upper bearing 14 and the shoulder 11 on the auxiliary member 10 engages the upper end of the lower bearing 16, as shown in Figure 2, thus preventing either of these members from either falling through or being projected through the bearings when the bushings are dislodged. The main member of the tool is then lifted out of the upper bearing and out of the auxiliary member 10, permitting the upper bushing 15 to be removed from the reduced portion 4 of the main member, and also permitting the auxiliary member 10 to be lifted out of the lower bearing 16.

The reduced portion 8 and shoulder 9 of the main member may be employed for the purpose of removing piston pins and sleeves, as well as bushings having diameters smaller than the bushings 15 and 17.

If it is desired to insert new bushings in the bearings 14 and 16, a new bushing 17 is inserted over the reduced portion 12 of the auxiliary member 10, and together with the member 10 is positioned between the bearings 14 and 16 in axial alignment with the lower bearing 16. A new upper bushing 15 is then slipped over the reduced portion 4 of the main member of the tool and the member is then inserted through the upper bearing 14 and through the tubular auxiliary member 10 until the shoulder 7 of the main portion engages the upper end of the auxiliary portion. Force is then applied to the handle 1 and the two bushings 15 and 17 are simultaneously forced into the bearings 14 and 16. When the new bushings have been properly positioned within the bearings 14 and 16, the main member of the tool is lifted vertically through the upper bearing 14 and out of engagement with the auxiliary member 10, thus permitting the latter to be removed from between the bearings 14 and 16.

In Figure 4 I have shown another form of the invention in which the tool is employed for removing bushings 15a and 17a from bearings 14a and 16a having a larger diameter than those shown in Figure 1. In this particular embodiment of my invention, I provide an auxiliary member 18 having a diameter equal to that of the lower bushing and provided with an upper shoulder 19 and with a reduced portion 20 adjacent to its lower end, forming a shoulder 21. A tubular adaptor or second auxiliary member 22, having a shoulder 23 adjacent to its upper end, is slipped over the reduced portion 2 of the main member of the tool for engagement with the upper end of the upper bushing 15a. The operation of this form of the invention is substantially the same as that hereinbefore described in connection with the structures shown in Figures 1 to 3, in that, when pressure is applied to the end of the handle 1 of the tool, the shoulder 21 on the auxiliary member 18 and the lower extremity of the adaptor 22 will simultaneously force the two bushings 15a and 17a downwardly until they are disengaged from the bearings 14a and 16a, at which point the shoulder 19 on the auxiliary member 18 and the shoulder 23 on the adaptor 22 engage the upper ends of the bearings 14a and 16a respectively, thus preventing these members from either falling on the floor or being projected through the bearings by the force applied thereto.

From the foregoing, it will be apparent that I have provided a very simple and efficient tool for removing bushings from bearings simultaneously and with but one operation, thus eliminating the necessity of first forcing one bushing from its bearing and then reversing the position of the work and with a separate operation removing the other bushing from its bearing.

It will be understood by those skilled in the art that the embodiment herein disclosed accomplishes at least the principal object of the invention, that it has uses and advantages other than those herein particularly referred to, and that various changes and modifications may be made without departing from the spirit of the invention, and accordingly the embodiment disclosed herein is illustrative only, and the invention is not limited thereto.

I claim:

1. A tool for removing bushings from and inserting bushings in spaced bearings comprising: a main member having a first reduced portion adapted to extend through a first bushing and forming a first shoulder for engagement with one end of said first bushing, and a second reduced portion forming a second shoulder; an auxiliary member having an axial opening for removable engagement by the second reduced portion of said main member and engageable by the second shoulder thereof, said auxiliary member being also formed with a reduced portion adapted to extend into a second bushing and forming a third shoulder for engagement with the corresponding end of said second bushing, said first and third shoulders being spaced apart a distance substantially equal to the distance between the ends of said first and second bushings engaged thereby, whereby said first and second bushings may be simultaneously removed from or inserted in said bearings in the same direction when pressure is applied to said main member; and an abutment on said auxiliary member for engagement with the bearing of said second bushing to limit the extent of movement of said auxiliary member.

2. A tool for removing bushings from and inserting bushings in spaced bearings comprising: a main member having a first reduced portion adapted to extend through a first bushing and forming a first shoulder for engagement with one end of said first bushing, and a second reduced portion forming a second shoulder; a handle for said main member forming a third shoulder for engagement with the bearing of said first bushing to limit the extent of movement of said main member; an auxiliary member having an axial opening for removable engagement by the second reduced portion of said main member and engageable by the second shoulder thereof, said auxiliary member being also formed with a reduced portion adapted to extend into a second bushing and forming a third shoulder for engagement with the corresponding end of said second bushing, said first and third shoulders being spaced apart a distance substantially equal to the distance between the ends of said first and second bushings engaged thereby, whereby said first and second bushings may be simultaneously removed from or inserted in said bearings in the same direction when pressure is applied to said main member; and an abutment on said auxiliary member for engagement with the bearing of said second bushing to limit the extent of movement of said auxiliary member.

3. A tool for removing bushings from and inserting bushings in spaced bearings comprising: a main member having a first reduced portion adapted to extend through a first bushing and forming a first shoulder for engagement with one end of said first bushing, and a second reduced portion forming a second shoulder; an auxiliary member having an axial opening for removable engagement by the second reduced portion of said main member and engageable by the second shoulder thereof, said auxiliary member being also formed with a reduced portion adapted to extend into a second bushing and forming a third shoulder for engagement with the corresponding end of said second bushing, said first and third shoulders being spaced apart a distance substantially equal to the distance between the ends of said first and second bushings engaged thereby, whereby said first and second bushings may be simultaneously removed from or inserted in said bearings in the same direction when pressure is applied to said main member; and a reduced extension on said main member extending beyond said auxiliary member and forming an abutment for removing pins and bushings having diameters less than that of said first mentioned bushings.

4. A tool for removing bushings from and inserting bushings in spaced bearings comprising: a main member having a first reduced portion adapted to extend through a first bushing and forming a first shoulder, and a second reduced portion adapted to extend through said second bushing and forming a second shoulder; a first auxiliary member removably mounted on said first reduced portion of said main member for engagement with said first shoulder and with one end of said first bushing; and a second auxiliary member having an axial opening for removable engagement by the second reduced portion of said main member and engageable by the second shoulder thereof, said auxiliary member being also formed with a reduced portion adapted to extend into a second bushing and forming a shoulder for engagement with the corresponding end of said second bushing, the bushing engaging end of said first auxiliary member and the bushing engaging shoulder of said second auxiliary member being spaced apart a distance substantially equal to the distance between the ends of said first and second bushings engaged thereby, whereby said first and second bushings may be simultaneously removed from or inserted in said bearings in the same direction when pressure is applied to said main member.

5. A tool for removing bushings from and inserting bushings in spaced bearings comprising: a main member having a first reduced portion adapted to extend through a first bushing and forming a first shoulder, and a second reduced portion forming a second shoulder; a first auxiliary member removably mounted on said first reduced portion of said main member for engagement with said first shoulder and with one end of said first bushing; an abutment on said first auxiliary member for engagement with the bearing of said first bushing to limit the extent of movement of said first auxiliary member; and a second auxiliary member having an axial opening for removable engagement by the second reduced portion of said main member and engageable by the second shoulder thereof, said second auxiliary member being also formed with a reduced portion adapted to extend into a second bushing and forming a shoulder for engagement with the corresponding end of said second bushing, the bushing engaging end of said first auxiliary member and the bushing engaging shoulder of said second auxiliary member being spaced apart a distance substantially equal to the distance between the ends of said first and second bushings engaged thereby, whereby said first and second bushings may be simultaneously removed from or inserted in said bearings in the same direction when pressure is applied to said main member.

6. A tool for removing bushings from and inserting bushings in spaced bearings comprising: a main member having a first reduced portion adapted to extend through a first bushing and forming a first shoulder, and a second reduced portion forming a second shoulder; a first auxiliary member removably mounted on said first reduced portion of said main member for engagement with said first shoulder and with one end of said first bushing; a second auxiliary member having an axial opening for removable engagement by the second reduced portion of said main member and engageable by the second shoulder thereof, said second auxiliary member being also formed with a reduced portion adapted to extend into a second bushing and forming a first shoulder for engagement with the corresponding end of said second bushing, the bushing engaging end of said first auxiliary member and the bushing engaging shoulder of said second auxiliary member being spaced apart a distance substantially equal to the distance between the ends of said first and second bushings engaged thereby, whereby said first and second bushings may be simultaneously removed from or inserted in said bearings in the same direction when pressure is applied to said main member; and an abutment on said second auxiliary member for engagement with the bearing of said second bushing to limit the extent of movement of said auxiliary member.

7. A tool for removing bushings from and inserting bushings in spaced bearings comprising: a main member having a first reduced portion adapted to extend through a first bushing and forming a first shoulder, and a second reduced portion forming a second shoulder; a first auxiliary member removably mounted on said first reduced portion of said main member for engagement with said first shoulder and with one end of said first bushing; an abutment on said first auxiliary member for engagement with the bearing of said first bushing to limit the extent of movement of said main member; a second auxiliary member having an axial opening for removable engagement by the second reduced portion of said main member and engageable by the second shoulder thereof, said second auxiliary member being also formed with a reduced portion adapted to extend into a second bushing and forming a shoulder for engagement with the corresponding end of said second bushing, the bushing engaging end of said first auxiliary member and the bushing engaging shoulder of said second auxiliary member being spaced apart a distance substantially equal to the distance between the ends of said first and second bushings engaged thereby, whereby said first and second bushings may be simultaneously removed from or inserted in said bearings in the same direction when pressure is applied to said main member; and an abutment on said second auxiliary member for engagement with the bearing of said second bushing to limit the extent of movement of said auxiliary member.

8. A tool for removing bushings from and inserting bushings in spaced bearings comprising: a main member having a first reduced portion adapted to extend through a first bushing and forming a first shoulder, and a second reduced portion forming a second shoulder; a first auxiliary member removably carried by said first reduced portion of said main member for engagement with said first shoulder and with one end of said first bushing; a second auxiliary member having an axial opening for removable engagement by the second reduced portion of said main member and engageable by the second shoulder thereof, said second auxiliary member being also formed with a reduced portion adapted to extend into a second bushing and forming a shoulder for engagement with the corresponding end of said second bushing, the bushing engaging end of said first auxiliary member and the bushing engaging shoulder of said second auxiliary member being spaced apart a distance substantially equal to the distance between the ends of said first and second bushings engaged thereby, whereby said first and second bushings may be simultaneously removed from or inserted in said bearings in the same direction when pressure is applied to said main member; and an extension on said main member having a diameter less than the second reduced portion thereof, extending beyond said second auxiliary member and forming a shoulder for removing pins and bushings having diameters less than that of said first mentioned bushings.

In testimony whereof I hereunto affix my signature.

CHARLES A. WILSON.